United States Patent
Lee et al.

(10) Patent No.: US 10,922,028 B2
(45) Date of Patent: Feb. 16, 2021

(54) DATA PROGRAMMING METHOD, MEMORY STORAGE DEVICE AND MEMORY CONTROL CIRCUIT UNIT

(71) Applicant: Hefei Core Storage Electronic Limited, Anhui Province (CN)

(72) Inventors: Hao-Zhi Lee, Miaoli (TW); Qi-Ao Zhu, Anhui Province (CN); Meng Xiao, Anhui Province (CN); Hui Xie, Anhui Province (CN)

(73) Assignee: Hefei Core Storage Electronic Limited, Anhui Province (CN)

( * ) Notice: Subject to any disclaimer, the term of this patent is extended or adjusted under 35 U.S.C. 154(b) by 116 days.

(21) Appl. No.: 15/590,018

(22) Filed: May 9, 2017

(65) Prior Publication Data

US 2018/0260163 A1 Sep. 13, 2018

(30) Foreign Application Priority Data

Mar. 7, 2017 (CN) .......................... 201710130537.3

(51) Int. Cl.
*G06F 3/06* (2006.01)
*G06F 11/10* (2006.01)
(Continued)

(52) U.S. Cl.
CPC .......... *G06F 3/0679* (2013.01); *G06F 3/0619* (2013.01); *G06F 3/0635* (2013.01);
(Continued)

(58) Field of Classification Search
CPC ............. G06F 11/1068; G06F 12/0207; G06F 12/0246; G06F 2003/0692; G06F 3/0679; G06F 3/0688; G06F 8/654
(Continued)

(56) References Cited

U.S. PATENT DOCUMENTS 9,021,177 B2 * 4/2015 Segal .................. G06F 12/0246
711/103
2009/0300269 A1 * 12/2009 Radke ................. G06F 12/0246
711/103
(Continued)

FOREIGN PATENT DOCUMENTS

| CN | 104126178 | 10/2014 |
|----|-----------|---------|
| CN | 105320464 | 2/2016 |
| CN | 105955672 | 9/2016 |

*Primary Examiner* — Yaima Rigol
(74) *Attorney, Agent, or Firm* — JCPRNET

(57) ABSTRACT

A data programming method, a memory storage device and a memory control circuit unit are provided. The method includes presetting a programming mode of a plurality of first type physical erasing units as a first programming mode, and presetting a programming mode of a plurality of second type physical erasing units as a second programming mode. The method also includes obtaining a change parameter according to usage parameters of the first type physical erasing units and the second type physical erasing units. The method further includes determining whether the change parameter matches a first change condition, and if the change parameter matches the first change condition, programming a write-data into the second type physical erasing unit by using the first programming mode.

24 Claims, 11 Drawing Sheets

(51) Int. Cl.
G06F 12/02 (2006.01)
G06F 8/654 (2018.01)

(52) U.S. Cl.
CPC .......... G06F 8/654 (2018.02); G06F 11/1068 (2013.01); G06F 12/0246 (2013.01); *G06F 2003/0692* (2013.01); *G06F 2212/1032* (2013.01); *G06F 2212/7202* (2013.01); *G06F 2212/7204* (2013.01)

(58) Field of Classification Search
USPC .................................................. 711/103, 115
See application file for complete search history.

(56) References Cited

U.S. PATENT DOCUMENTS

| | | | | |
|---|---|---|---|---|
| 2009/0327591 | A1* | 12/2009 | Moshayedi | G06F 11/1441 711/103 |
| 2010/0122016 | A1* | 5/2010 | Marotta | G06F 12/0246 711/103 |
| 2010/0172179 | A1* | 7/2010 | Gorobets | G06F 12/0246 365/185.09 |
| 2010/0174852 | A1* | 7/2010 | Chien | G11C 29/44 711/103 |
| 2013/0173844 | A1* | 7/2013 | Chen | G06F 12/0246 711/103 |
| 2013/0265825 | A1* | 10/2013 | Lassa | G06F 3/0619 365/185.11 |
| 2013/0336072 | A1* | 12/2013 | Wood | G11C 16/20 365/185.24 |
| 2013/0346676 | A1* | 12/2013 | Kim | G06F 12/0246 711/103 |
| 2015/0058530 | A1* | 2/2015 | Reddy | G06F 3/0616 711/103 |
| 2015/0095546 | A1* | 4/2015 | Bennett | G06F 12/0246 711/5 |
| 2016/0041760 | A1* | 2/2016 | Kuang | G11C 16/3495 711/103 |
| 2017/0228172 | A1* | 8/2017 | Wu | G06F 3/0616 |

* cited by examiner

DATA PROGRAMMING METHOD, MEMORY STORAGE DEVICE AND MEMORY CONTROL CIRCUIT UNIT

CROSS-REFERENCE TO RELATED APPLICATION

This application claims the priority benefit of China application serial no. 201710130537.3, filed on Mar. 7, 2017. The entirety of the above-mentioned patent application is hereby incorporated by reference herein and made a part of this specification.

BACKGROUND

Technical Field

The present invention relates to a data programming method, and more particularly, relates to a data programming method for a rewritable non-volatile memory module, and a memory storage device and a memory control circuit unit using the method.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

In the rewritable non-volatile memory module of a specific type, such as a MLC (Multi Level Cell) NAND flash memory module, one memory cell can be used to store multiple bits. A memory controller of the rewritable non-volatile memory module of this type usually divides physical erasing units into different groups for performing programming operation by using different programming modes. When a host system intends to store data into the rewritable non-volatile memory module, the memory controller can select the physical erasing units for storing the data from the different groups according to the data to be stored. For example, when the data that the host system intends to store is a non-sequential random data, the memory controller can program the data into the physical erasing units in the corresponding group by using a programming mode with higher programming speed.

However, when the physical erasing units of the same group are continuously used to store data, erase counts of the physical erasing units belonging to said group are usually far greater than erase counts of the physical erasing units belonging to the other groups. Consequently, the erase counts of the physical erasing units belonging to said group will reach its upper limit faster and shorten the lifetime of the rewritable non-volatile memory module.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a data programming method, a memory storage device, a memory control circuit unit, which are capable of improving a reliability of the rewritable non-volatile memory module.

An exemplary embodiment of the present invention provides a data programming method for a rewritable non-volatile memory module having a plurality of physical erasing units. The data programming method includes: dividing the physical erasing units into a plurality of first type physical erasing units and a plurality of second type physical erasing units, wherein a programming mode of the first type physical erasing units is preset as a first programming mode, and a programming mode of the second type physical erasing units is preset as a second programming mode. The method also includes recording a usage parameter of each physical erasing unit, and obtaining a change parameter according to the usage parameters of the first type physical erasing units and the usage parameters of the second type physical erasing units. The method still includes receiving a write-data from a host system, and determining whether the usage parameter matches a first change condition. The method further includes, if the change parameter matches the first change condition, selecting at least one physical erasing unit from the second type physical erasing units, and programming the write-data into the at least one physical erasing unit selected from the second type physical erasing units by using the first programming mode.

An exemplary embodiment of the present invention provides a memory storage device including a connection interface unit, a rewritable non-volatile memory module and a memory control circuit unit. The connection interface unit is configured to couple to a host system. The rewritable non-volatile memory module includes a plurality of physical erasing units. The memory control circuit unit is coupled to the connection interface unit and the rewritable non-volatile memory module. The memory control circuit unit is configured to divide the physical erasing units into a plurality of first type physical erasing units and a plurality of second type physical erasing units, wherein a programming mode of the first type physical erasing units is preset as a first programming mode, and a programming mode of the second type physical erasing units is preset as a second programming mode. Furthermore, the memory control circuit unit is further configured to record a usage parameter of each physical erasing unit, and obtain a change parameter according to the usage parameters of the first type physical erasing units and the user parameters of the second type physical erasing units. Moreover, the memory control circuit unit is further configured to receive a write-data from a host system, and determine whether the usage parameter matches a first change condition. If determining that the change parameter matches the first change condition, the memory control circuit unit is further configured to select at least one physical erasing unit from the second type physical erasing units, and program the write-data into the at least one physical erasing unit selected from the second type physical erasing units by using the first programming mode.

An exemplary embodiment of the present invention provides a memory control circuit unit for controlling a rewritable non-volatile memory module. The rewritable non-volatile memory module includes a plurality of physical erasing units. The memory control circuit unit includes a host interface, a memory interface and a memory management circuit. The host interface is configured to couple to a host system. The memory interface is configured to couple to the rewritable non-volatile memory module. The memory management circuit is coupled to the host interface and the memory interface. The memory management circuit is configured to divide the physical erasing units into a plurality of first type physical erasing units and a plurality of second type physical erasing units, wherein a programming mode of the first type physical erasing units is preset as a first programming mode, and a programming mode of the second type physical erasing units is preset as a second programming mode. Furthermore, the memory management circuit is further configured to record a usage parameter of each physical erasing unit, and obtain a change parameter according to the usage parameters of the first type physical erasing units and the user parameters of the second type physical erasing units. Moreover, the memory management circuit is further configured to receive a write-data from a host system, and determine whether the usage parameter matches a first change condition. If determining that the change parameter matches the first change condition, the memory management circuit is further configured to select at least one physical erasing unit from the second type physical erasing units, and program the write-data into the at least one physical erasing unit selected from the second type physical erasing units by using the first programming mode.

Based on the above, when the received write-data matches the data condition, the first type physical erasing units and the second type physical erasing units may be dynamically selected for storing data by determining the change parameter for changing between the first type physical erasing units and the second type physical erasing units matches the change condition. As a result, the reliability of the rewritable non-volatile memory module can be improved.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
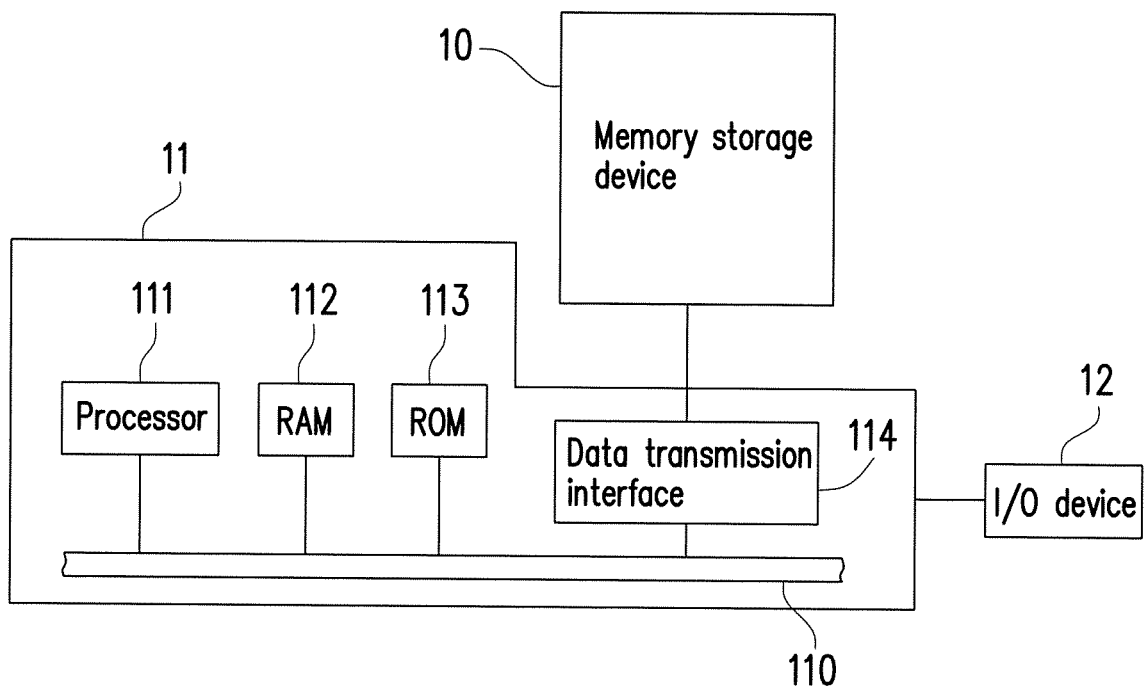
FIG. 1 is a schematic diagram illustrating a host system, a memory storage device and an input/output (I/O) device according to an exemplary embodiment.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" "an"), "one or more" and "at least one" can be used interchangeably herein.

Generally, a memory storage device (also known as a memory storage system) includes a rewritable non-volatile memory module and a controller (also known as a control circuit unit). The memory storage device is usually configured together with a host system so the host system can write data into the memory storage device or read data from the memory storage device.

Figure 2:
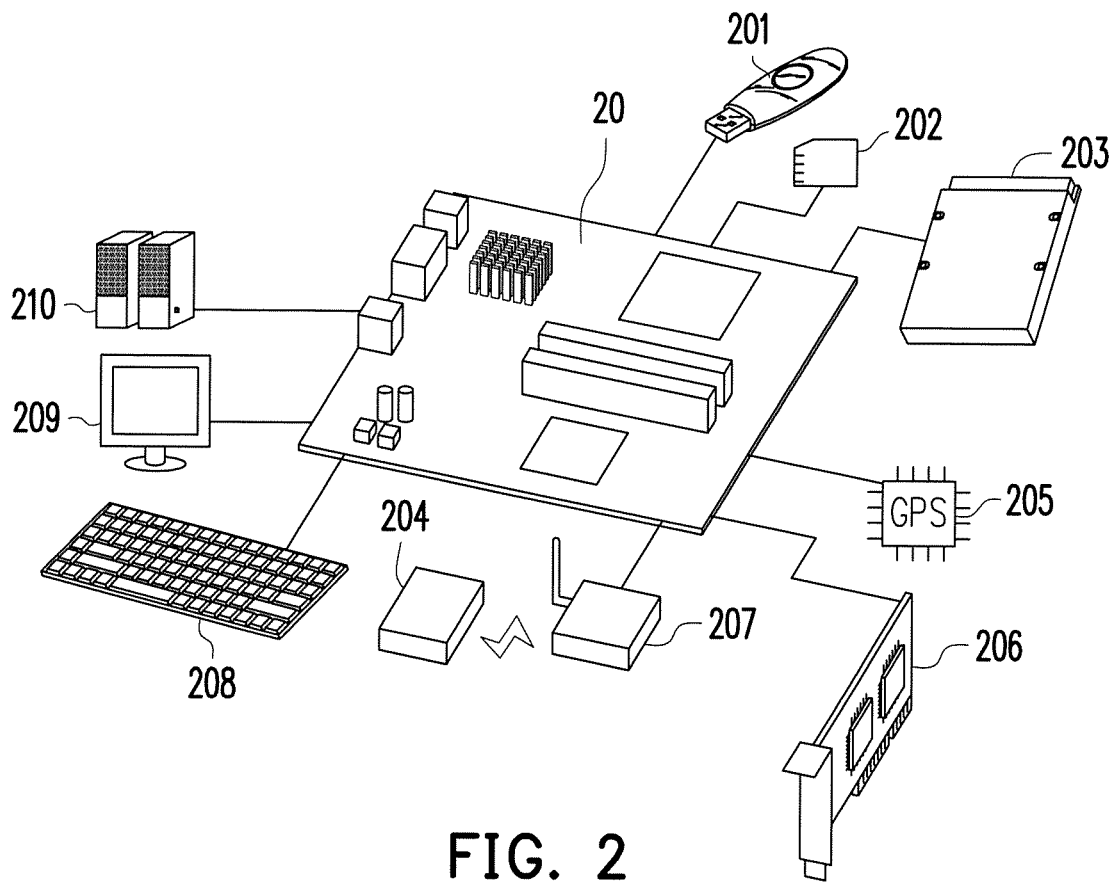
FIG. 2 is a schematic diagram illustrating a host system, a memory storage device and an input/output (I/O) device according to another exemplary embodiment.

FIG. 1 is a schematic diagram illustrating a host system, a memory storage device and an input/output (I/O) device according to an exemplary embodiment, and FIG. 2 is a schematic diagram illustrating a host system, a memory storage device and an input/output (I/O) device according to another exemplary embodiment.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage device 10 through the data transmission interface 114. For example, the host system 11 can write data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication Storage) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
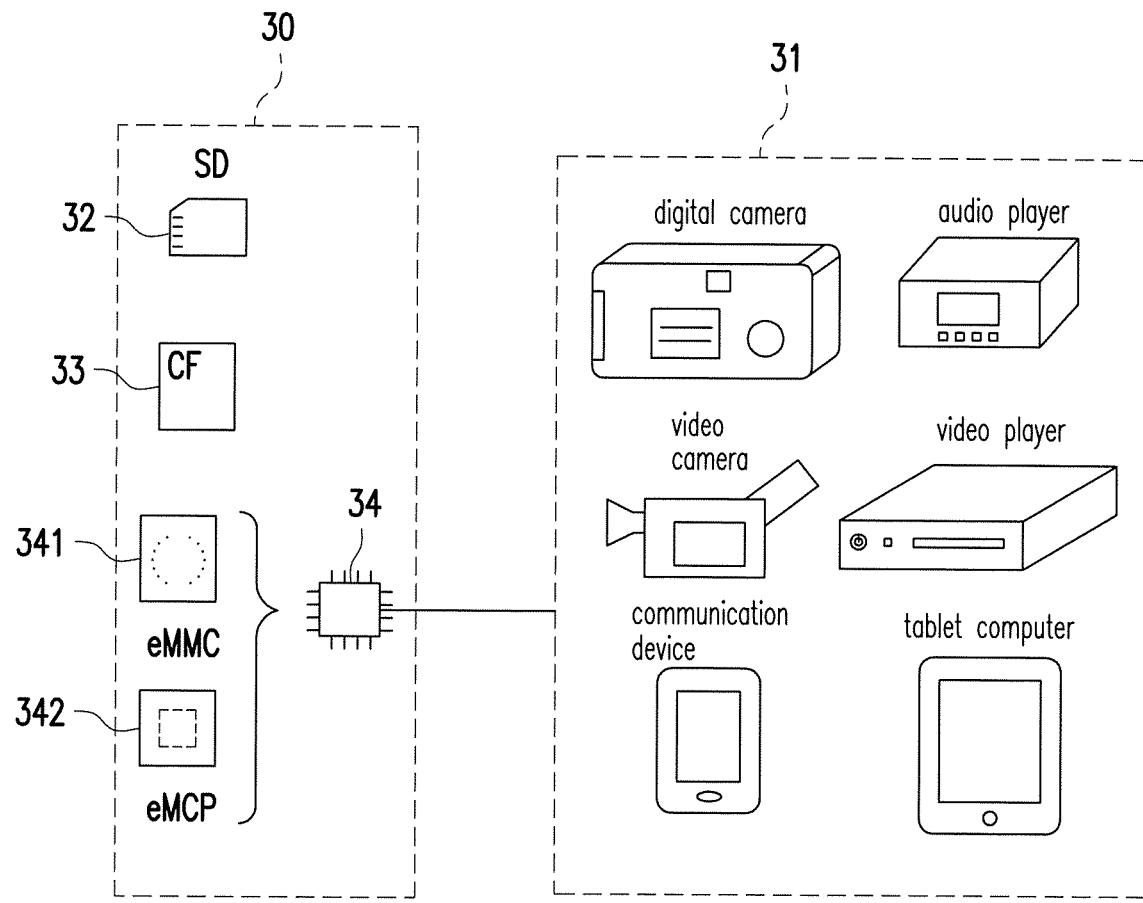
FIG. 3 is a schematic diagram illustrating a host system and a memory storage device according to another exemplary embodiment.

In an exemplary embodiment, aforementioned host system may be any system capable of substantially cooperating with the memory storage device for storing data. Although the host system s illustrated as a computer system in foregoing exemplary embodiment, Nonetheless, FIG. 3 is a schematic diagram illustrating a host system and a memory storage device according to another exemplary embodiment. Referring to FIG. 3, in another exemplary embodiment, a host system 31 may also be a system including a digital camera, a video camera, a communication device, an audio player, a video player or a tablet computer, whereas a memory storage device 30 may be various non-volatile memory storage devices used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
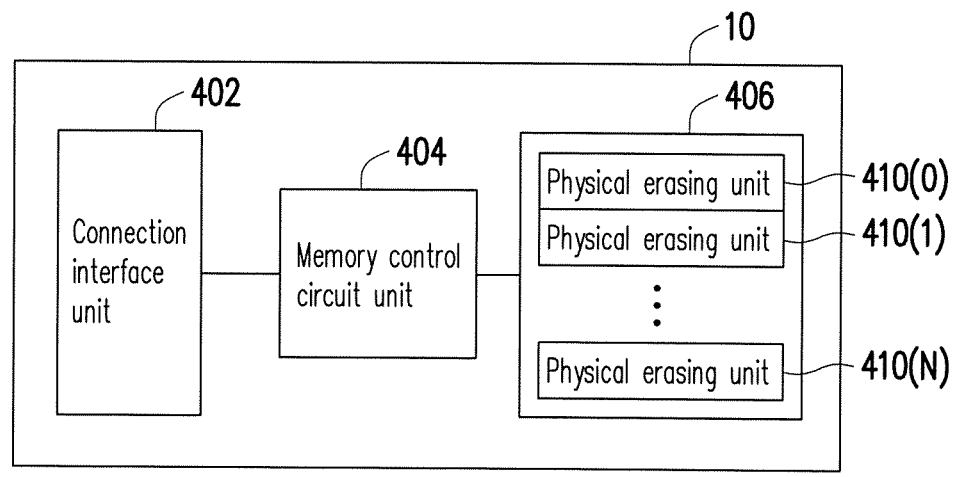
FIG. 4 is a schematic block diagram illustrating a host system and a memory storage device according to an exemplary embodiment.

FIG. 4 is a schematic block diagram illustrating a host system and a memory storage device according to an exemplary embodiment.

Referring to FIG. 4, the memory storage device 10 includes a connection interface unit 402, a memory control circuit unit 404 and a rewritable non-volatile memory module 406.

In the present exemplary embodiment, the connection interface unit 402 is compatible with a SATA (Serial Advanced Technology Attachment) standard. Nevertheless, it should be understood that the invention is not limited thereto. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a UHS-I (Ultra High Speed-I) interface standard, a UHS-II (Ultra High Speed-II) interface standard, a SD (Secure Digital) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. In the present exemplary embodiment, the connection interface unit 402 and the memory control circuit unit 404 may be packaged into one chip, or the connection interface unit 402 is distributed outside of a chip containing the memory control circuit unit.

The memory control circuit unit 404 is configured to execute a plurality of logic gates or control commands which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory storage module 406 includes multiple physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. Nevertheless, it should be understood that the disclosure is not limited thereto. Each physical erasing unit may be composed of 64 physical programming units, 256 physical programming units or any number of the physical programming units.

More specifically, the physical erasing unit is the minimum unit for erasing. Namely, each physical erasing unit contains the least number of memory cells to be erased together. The physical programming unit is the minimum unit for programming. That is, the physical programming unit is the minimum unit for writing data. Each physical programming unit usually includes a data bit area and a redundancy bit area. The data bit area having multiple physical access addresses is used to store user data, and the redundant bit area is used to store system data (e.g., control information and error checking and correcting code). In the present exemplary embodiment, each data bit area of the physical programming unit contains 8 physical access addresses, and the size of each physical access address is 512 byte. However, in other exemplary embodiments, the data bit area may also contain more or less physical access addresses, and the number and size of the physical access addresses are not limited by the invention. For example, in an exemplary embodiment, the physical erasing unit is a physical block, and the physical programming unit is a physical page or a physical sector, but the invention is not limited thereto.

The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This process of changing the threshold voltage is also known as "writing data into the memory cell" or "programming the memory cell". Each of the memory cells in the rewritable non-volatile memory module 406 has a plurality of storage statuses depended on changes in the threshold voltage. The storage state to which the memory cell belongs may be determined by applying a read voltage to the memory cell, so as to obtain the one or more bits stored in the memory cell.

In the present exemplary embodiment, the memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells can store more than one bit, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is higher than a writing speed of the upper physical programming unit, and/or a reliability of the lower physical programming unit is higher than a reliability of the upper physical programming unit.

Figure 5:
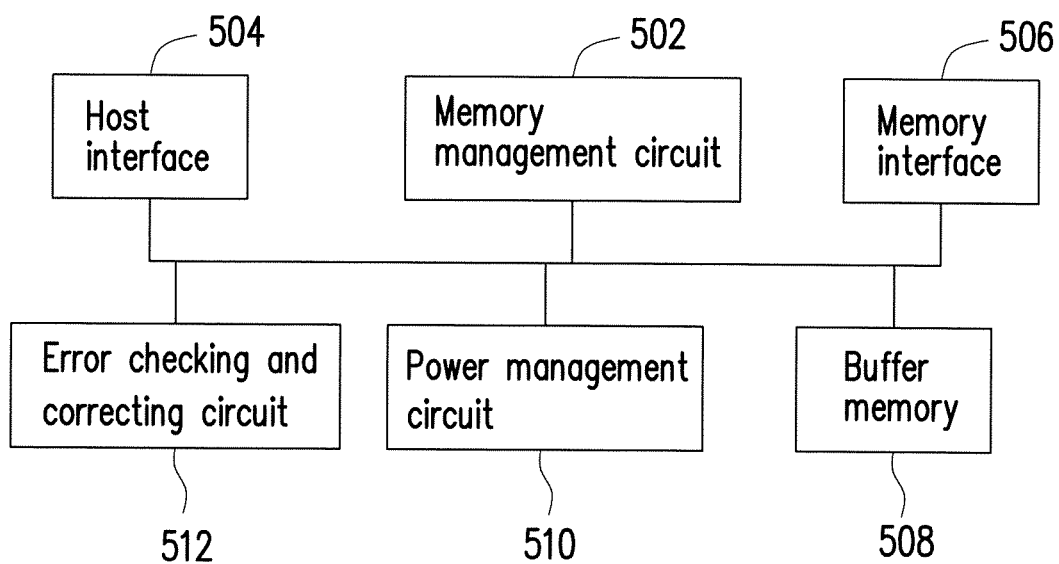
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 404 includes a memory management circuit 502, a host interface 504, a memory interface 506, a buffer memory 508, a power management circuit 510, and an error checking and correcting circuit 512.

The memory management circuit 502 is configured to control overall operations of the memory control circuit unit 404. Specifically, the memory management circuit 502 has a plurality of control commands and the control commands are executed to execute various operations such as writing, reading and erasing data during operation of the memory storage device 10.

In the present exemplary embodiment, the control commands of the memory management circuit 502 are implemented in form of firmware. For instance, the memory management circuit 502 has a microprocessor unit (not illustrated) and a read-only memory (not illustrated), and the control commands are burnt into the read-only memory. During operation of the memory storage device 10, the control commands are executed by the microprocessor to perform operations of writing, reading or erasing data.

In another exemplary embodiment, the control commands of the memory management circuit 502 may also be stored, in form of program codes, into a specific area (e.g., a system area in the memory module exclusively for storing the system data) of the rewritable non-volatile memory module 406. In addition, the memory management circuit 502 has a microprocessor unit (not illustrated), a ROM (not illustrated) and a RAM (not illustrated). Particularly, the ROM has a boot code, which is executed by the microprocessor unit to load the control commands stored in the rewritable non-volatile memory module 406 to the RAM of the memory management circuit 502 when the memory control circuit unit 404 is enabled. Thereafter, the control commands are executed by the microprocessor unit to perform operations of writing, reading or erasing data.

Further, in another exemplary embodiment, the control commands of the memory management circuit 502 may also be implemented in a form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory management circuit is configured to manage the physical erasing units of the rewritable non-volatile memory module 406; the memory writing circuit is configured to give a write command to the rewritable non-volatile memory module 406 in order to write data into the rewritable non-volatile memory module 406; the memory reading circuit is configured to give a read command to the rewritable non-volatile memory module 406 in order to read data from the rewritable non-volatile memory module 406; the memory erasing circuit is configured to give an erase command to the rewritable non-volatile memory module 406 in order to erase data from the rewritable non-volatile memory module 406; and The data processing circuit is configured to process both the data to be written into the rewritable non-volatile memory module 406 and the data read from the rewritable non-volatile memory module 406.

The host interface 504 is coupled to the memory management circuit 502 and configured to couple to the connection interface unit 402, so as to receive and identify commands and data sent from the host system 11. In other words, the commands and data transmitted by the host system 11 are transmitted to the memory management circuit 502 via the host interface 504. In the present exemplary embodiment, the host interface 504 is compatible with the SATA standard. However, it should be understood that the present invention is not limited thereto, and the host interface 504 may also be compatible with a PATA standard, an IEEE 1394 standard, a PCI Express standard, a USB standard, a UHS-I standard, a UHS-II standard, a SD standard, a MS standard, a MMC standard, a CF standard, an IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506.

The buffer memory 508 is coupled to the memory management circuit 502 and configured to temporarily store data and commands from the host system 11 or data from the rewritable non-volatile memory module 406.

The power management unit 510 is coupled to the memory management circuit 502 and configured to control a power of the memory storage device 10.

The error checking and correcting circuit 512 is coupled to the memory management circuit 502 and configured to execute an error checking and correcting procedure to ensure the data integrity. Specifically, when the memory management circuit 502 receives a write command from the host system 11, the error checking and correcting circuit 512 generates an ECC code (Error Checking and Correcting Code) for the data corresponding to the write command, and the memory management circuit 502 writes the data and the ECC code corresponding to the write command into the rewritable non-volatile memory module 406. Later, while reading the data from the rewritable non-volatile memory module 406, the memory management circuit 502 also reads the error checking and correcting code corresponding to the data, and the error checking and correcting circuit 512 executes the error checking and correcting procedure for the read data according to the error checking and correcting code.

In the following description, the operations executed by the memory management circuit 502, the host interface 504, the memory interface 506, the buffer memory 508, the power management circuit 510 and the error checking and correcting circuit 512 may also be referred to as being executed by the memory control circuit unit 404.

Figure 6A:
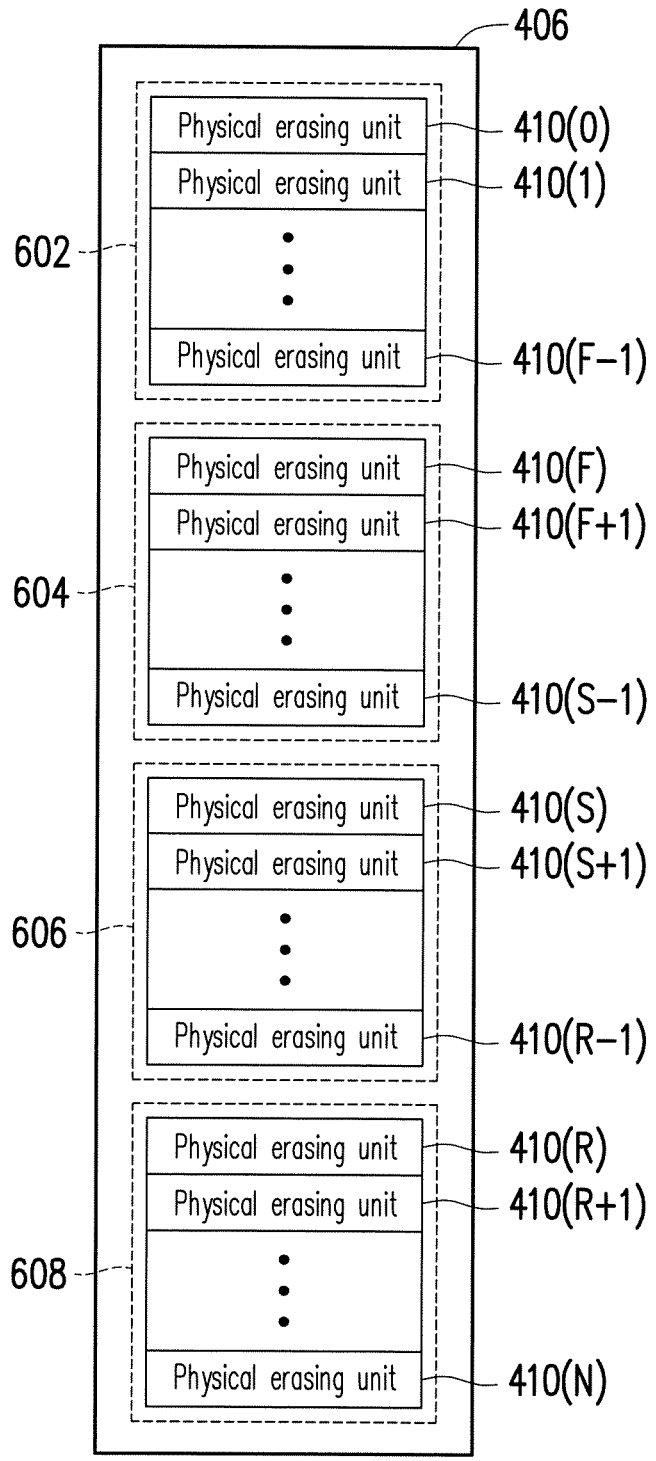
FIG. 6A and FIG. 6B are schematic diagrams illustrating a management of physical erasing units according to an exemplary embodiment.
Figure 6B:
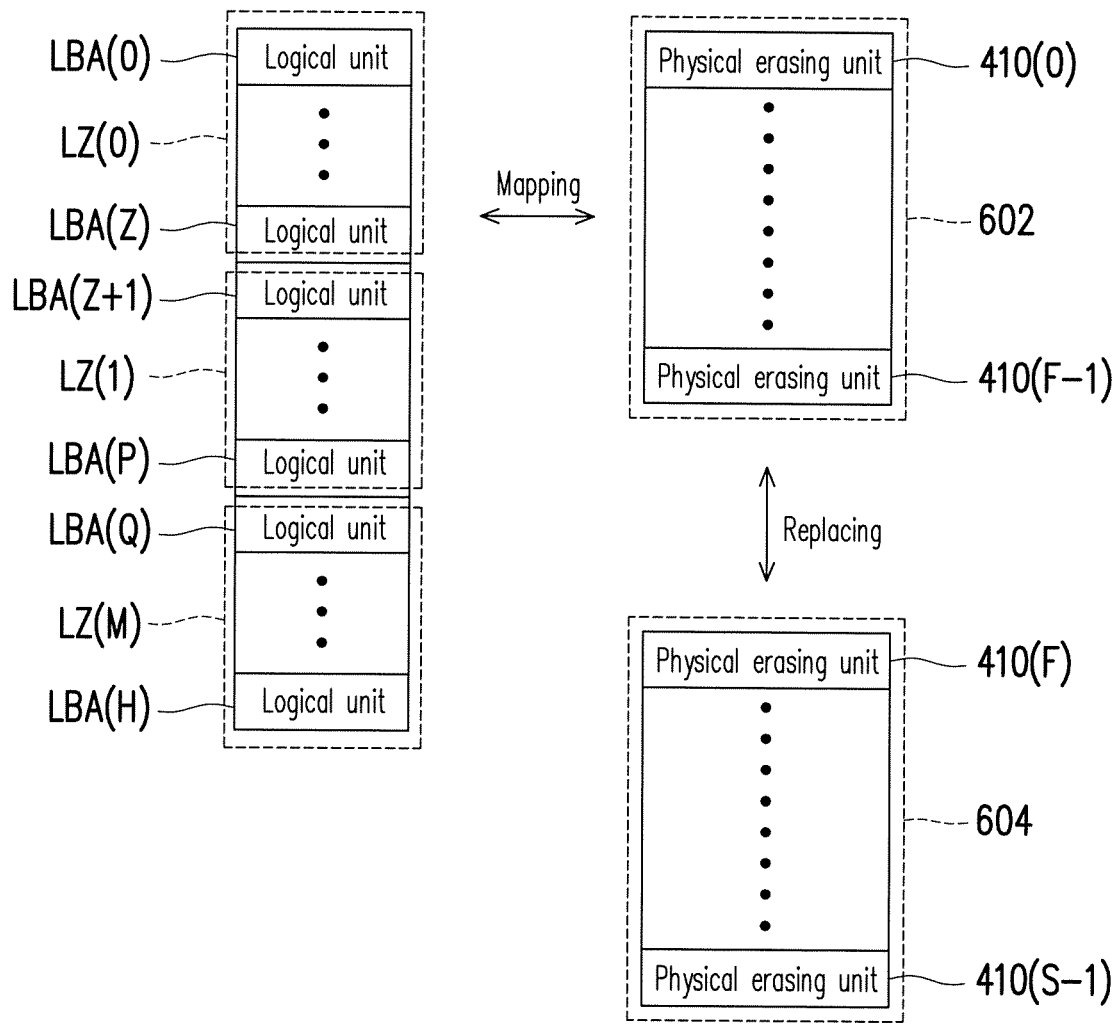

FIG. 6A and FIG. 6B are schematic diagrams illustrating a management of physical erasing units according to an exemplary embodiment.

It should be understood that terms, such as "get", "retrieve", "group", "divide", "associate" and so forth, are logical concepts which describe operations in the physical erasing units of the rewritable non-volatile memory module 406. In other words, the physical erasing units of the rewritable non-volatile memory module are logically operated so actual positions of the physical units of the rewritable non-volatile memory module are not changed.

Referring to FIG. 6A, the memory management circuit 502 logically groups the physical erasing units 410(0) to 410(N) into a data area 602, a spare area 604, a system area 606 and a replacement area 608.

The physical erasing units logically belonging to the data area 602 and the spare area 604 are configured to store data from the host system 11. More specifically, the physical erasing units of the data area 602 are regarded as the physical erasing units stored with the data, whereas the physical erasing units of the spare area 604 are configured to replace the physical erasing units of the data area 602. In other words, when the write command and the data to be written are received from the host system 11, the memory management circuit 502 selects the physical erasing units from the spare area 604, and writes the data into the selected physical erasing units in order to replace the physical erasing units in the data area 602.

The physical erasing units logically belonging to the system area 606 are configured to record system data. For example, the system data includes information related to manufacturer and model of the rewritable non-volatile memory module, the number of physical erasing units in the rewritable non-volatile memory module, the number of the physical programming units in each physical erasing unit, and so forth.

The physical erasing units logically belonging to the replacement area 608 are used in a bad physical erasing unit replacement procedure for replacing damaged physical erasing units. More specifically, if the replacement area 608 still includes normal physical erasing units when the physical erasing units of the data area 602 are damaged, a memory management circuit 502 retrieves the normal physical erasing units from the replacement area 608 for replacing the damaged physical erasing units.

Particularly, the numbers of the physical erasing units in the data area 602, the spare area 604, the system area 606 and the replacement area 608 may be different from one another according to the different memory specifications. In addition, it should be understood that, during operation of the memory storage device 10, grouping relations of the physical erasing units for associating with the data area 602, the spare area 604, the system area 606, and the replacement area 608 may be dynamically changed. For example, when the damaged physical erasing units in the spare area 604 are replaced by the physical erasing units in the replacement area 608, the physical erasing units originally from the replacement area 608 are then associated with the spare area 604.

Referring to FIG. 6B, the memory management circuit 502 may be configured with logical units LBA(0) to LBA(H) for mapping to the physical erasing units in the data area 602, and each of the logical units includes a plurality of logical sub-units for mapping to the corresponding physical programming units of the physical erasing units. Further, when the host system 11 intends to write the data into the logical units or update the data stored in the logical units, the memory management circuit 502 can retrieve one physical erasing unit from the spare area 604 as replacement to the physical erasing units of the data area 602 for writing the data. In the present exemplary embodiment, the logical sub-units may be logical pages or logical sectors.

In order to identify the physical erasing units to which the data of each logical unit is being stored to, the memory management circuit 502 can record a mapping between the logical unit and the physical erasing unit in the present exemplary embodiment. Further, when the host system 11 intends to access the data in the logical sub-unit, the memory management circuit 502 can confirm the logical unit to which the logical sub-unit belongs and access the data in the physical erasing unit mapped to the logical unit. For instance, in the present exemplary embodiment, the memory management circuit 502 stores logical address-physical address mapping tables into the rewritable non-volatile memory module 406 for recording the physical erasing units mapped to the logical units, and the logical address-physical address mapping tables are loaded into the buffer memory 508 for maintenance when the memory management circuit 502 intends to the access the data.

It should be noted that, the mapping table cannot record the mapping relation for all of the logical units because a capacity of the buffer memory 508 is limited. Therefore, in the present exemplary embodiment, the memory management unit 502 can group the logical units LBA(0) to LBA(H) into a plurality of logical zones LZ(0) to LZ(M) and configure one logical address-physical address mapping table for each of the logical zones. In particular, when the memory management unit 502 intends to update the mapping relation for one specific logical unit, the logical address-physical address mapping table corresponding to the logical zone to which the logical unit belongs may be loaded into the buffer memory 508 for updating.

In the present exemplary embodiment, the rewritable non-volatile memory module 406 may be managed based on the physical programming units (also known as page based). For example, when the write command is executed, regardless of the logical sub-unit of whichever logical unit is a write-data be written to as instructed by the write command, the memory management unit 502 writes the data in a manner of one physical programming unit after another physical programming unit (also known as a random writing mechanism). Specifically, the memory management circuit 502 retrieves one empty physical erasing unit from the spare area 604 to serve as a currently used physical erasing unit for writing data. Further, when the currently used physical erasing unit is fully written, the memory management circuit 502 retrieves another empty physical erasing unit from the spare area 604 to serve as the currently used physical erasing unit for continuously writing the write-data corresponding to the write command from the host system 11.

In the present exemplary embodiment, the memory management circuit 502 divides at least a part of the physical erasing units in the rewritable non-volatile memory module 406 into first type physical erasing units, and presets a programming mode of the first type physical erasing units as one specific programming mode (a.k.a. a first programming mode). Further, the memory management circuit 502 also divides at least another part of the physical erasing units in the rewritable non-volatile memory module 406 into second type physical erasing units, and presets a programming mode of the second type physical erasing units as another programming mode (a.k.a. a second programming mode). In general, a programming speed for programming the memory cells by using the first programming mode is higher than a programming speed for programming the memory cells by using the second programming mode, and a reliability of the data programmed by using the first programming mode is often higher than a reliability of the data programmed by using the second programming mode. Further, in an exemplary embodiment, the memory management circuit 502 can manage the first type physical erasing units and the second type physical erasing units in a manner of queue.

In the present exemplary embodiment, the first programming mode refers to one of a single layer memory cell (SLC) mode, a lower physical programming mode, a mixture programming mode and a less layer memory cell mode. In the single layer memory cell mode, one memory cell is only stored with data of one bit. In the lower physical programming mode, only the lower physical programming units are programmed, and the upper physical programming units corresponding to the lower physical programming units may not be programmed. In the mixture programming mode, valid data (or real data) are programmed into the lower physical programming units, and dummy data is programmed into the upper physical programming units corresponding to the lower physical programming units sorted with the valid data at the same time. In the less layer memory cell mode, one memory cell stores data with a first number of bits. For example, the first number may be set to "1".

In the present exemplary embodiment, the second programming mode refers to a Multi level cell (MLC) programming mode, a Trinary level cell (TLC) programming mode or other similar modes. In the second programming mode, one memory cell is stored with data of a second number of bits, and the second number is equal to or greater than "2". For example, the second number may be set to 2 or 3. In another exemplary embodiment, the first number in the first programming mode and the second number in the second programming mode may be other numbers as long as the second number is greater than the first number. In other words, a number (i.e., the first number) of data bits stored by each of the memory cells constituting the first type physical erasing units programmed by using the first programming mode is less than a number (i.e., the second number) of data bits stored by each of the memory cells constituting a second-type physical erasing unit programmed by using the second programming mode.

It is noted that, the first programming mode and the second programming mode can cause different wear levels for the physical erasing units. Thus, in the present exemplary embodiment, the first type physical erasing units are programmed with data only by using the first programming mode. In other words, if one first type physical erasing unit is to be programmed with data again after the data therein has been erased, such first type physical erasing unit can still be programmed with data only by using the first programming mode rather than using the second programming mode. On the hand, if one second type physical erasing unit is to be programmed with data again after data therein has been erased, such second type physical erasing unit can be programmed by using the first programming mode or the second programming mode, depending on actual requirements.

Figure 7:
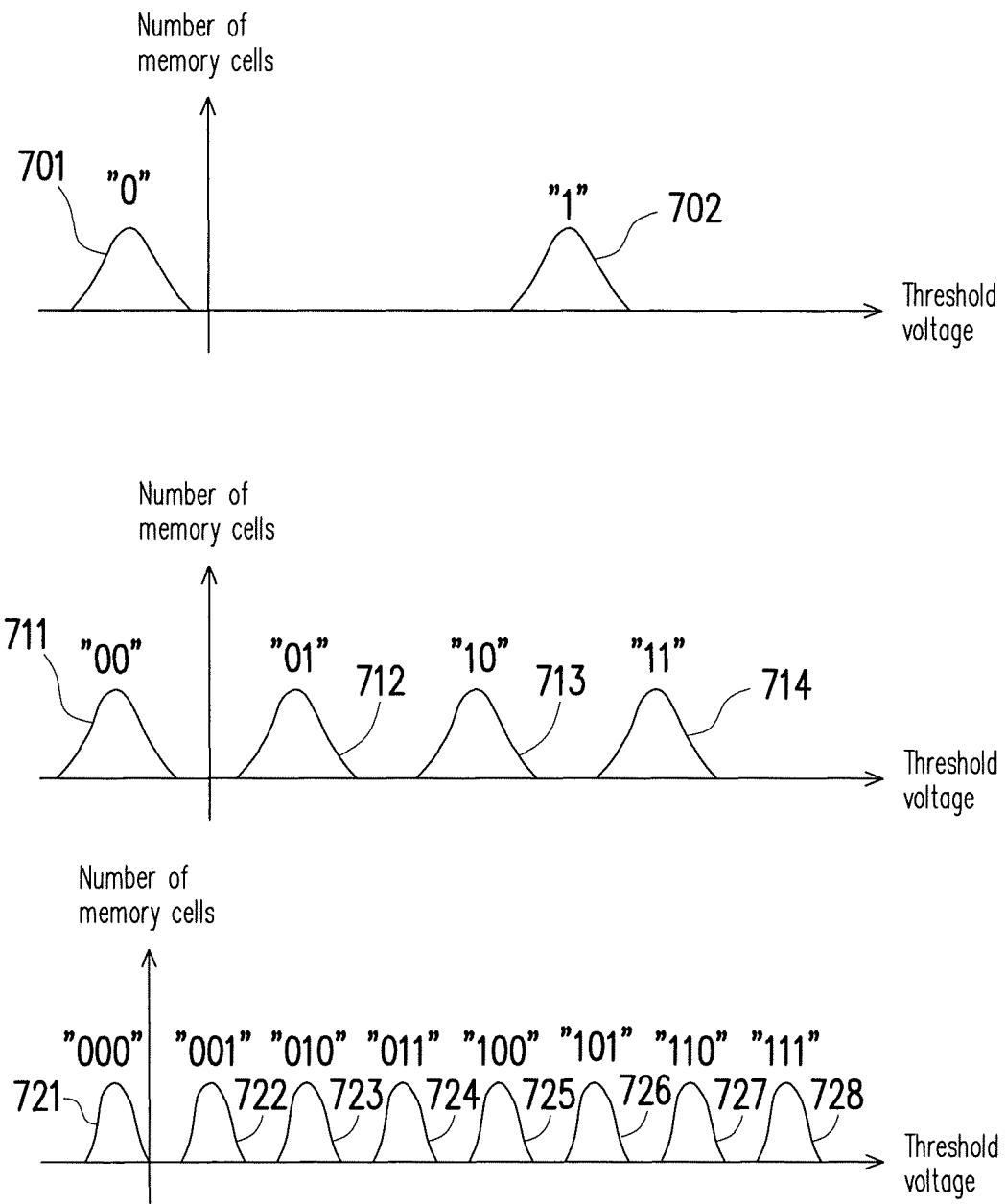
FIG. 7 is a schematic diagram illustrating threshold voltage distributions of the memory cells according to an exemplary embodiment.

FIG. 7 is a schematic diagram illustrating threshold voltage distributions of the memory cells according to an exemplary embodiment.

Referring to FIG. 7, in the present exemplary embodiment, if the memory cells are programmed by using the first programming mode, the threshold voltage distributions of the programmed memory cells may include distributions 701 and 702. For example, if one specific memory cell is programmed to store a bit "0", a threshold voltage of that specific memory cell belongs to the distribution 701; and if one specific memory cell is programmed to store a bit "1", a threshold voltage of that specific memory cell belongs to the distribution 702. However, in another exemplary embodiment, the memory cell with the threshold voltage belonging to the distribution 701 may also be used to store the bit "1", and the memory cell with the threshold voltage belonging to the distribution 702 may also be used to store the bit "0". In addition, if the memory cells are programmed based on the second programming mode, the threshold voltage distributions of the programmed memory cells may include distributions 714 to 714 or 721 to 728.

In an exemplary embodiment where the second number is "2", if one specific memory cell is programmed to store a bit "00", a threshold voltage of that specific memory cell belongs to the distribution 711; if one specific memory cell is programmed to store a bit "01", a threshold voltage of that specific memory cell belongs to the distribution 712; if one specific memory cell is programmed to store a bit "10", a threshold voltage of that specific memory cell belongs to the distribution 713; if one specific memory cell is programmed to store a bit "11", a threshold voltage of that specific memory cell belongs to the distribution 714. However, in another exemplary embodiment, the memory cells with the threshold voltages belonging to the distribution 711 to 714 may also be respectively used to store the bits "11", "10", "01" and "00" or other bit values with a total number of bits being "2".

In an exemplary embodiment where the second number is "3", the memory cells belonging to the distributions 721 to 728 are respectively used to store bits "000", "001", "010", "011", "100", "101", "110" and "111". However, in another exemplary embodiment, the memory cells with the threshold voltage belonging to the distribution 721 to 728 may also be respectively used to store the bits "111", "110", "101", "100", "011", "010", "001" and "000" or other bit values with a total number of bits being "3".

For clear description, in the following exemplary embodiments, an example of the first programming mode is described using a SLC mode in which each one memory is stored with the data of "1" bit, and an example of the second programming mode is described using a programming mode in which each one memory is stored with the data of "2" or "3" bits. Yet, in other exemplary embodiments, any kind of the first programming mode and the second programming mode may be adopted as long as aforesaid condition may be satisfied.

When the host system 11 intends to store data, the host system 11 sends a write command to the memory storage device 10. In the present exemplary embodiment, when the write command is received, the memory management circuit 502 determines whether to use the first programming mode or the second programming mode to program the write-data into the physical erasing units by determining whether the received write-data matches a data condition. For example, the memory management circuit 502 programs the write-data matching the data condition into the physical erasing units by using the first programming mode, and programs the write-data not matching the data condition into the physical erasing units by using the second programming mode.

For example, in an exemplary embodiment, the memory management circuit 502 may preset one data volume threshold, and determine whether the write-data matches the data condition by comparing a data volume of the write-data with the preset data volume threshold. When the data volume of the write-data is greater than the preset data volume threshold, the memory management circuit 502 may determine that the write-data does not match the data condition. In addition, when the data volume of the write-data is not greater than the preset data volume threshold, the memory management circuit 502 may determine that the write-data matches the data condition. For example, the preset data volume threshold may be set as the size of one page. When the data volume of the write-data is not greater than the size of one page, the memory management circuit 502 may determine that the write-data is a random data, and thus determines that the write-data matches the data condition. Further, when the data volume of the write-data is greater than the size of one page, the memory management circuit 502 can determine that the write-data is a sequential data, and thus determines that the write-data does not match the data condition. Nonetheless, in another exemplary embodiment, the memory management circuit 502 may also determine that the write-data matches the data condition when determining that the write-data is the system data.

It is noted that, when determining that the write-data does not match the data condition (e.g., when the received data is the sequential data), the memory management circuit 502 programs the write-data not matching the data condition (e.g., the sequential data) into at least one of the second type physical erasing units by using the second programming mode. Further, the memory management circuit 502 programs the write-data matching the data condition (e.g., the random data or the system data) into the first type physical erasing units or the second type physical erasing units by using the first programming mode.

For instance, the memory management circuit 502 may set the first type physical erasing units and the second type physical erasing units as a use area in turns, and select the physical erasing units from the use area for storing the write-data matching the data condition. Specifically, the memory management circuit 502 can obtain a change parameter by obtaining usage parameters indicating use status of the first type physical erasing units and usage parameters indicating use status of the second type physical erasing units, and determine the use area according to the obtained change parameter.

Figure 8:
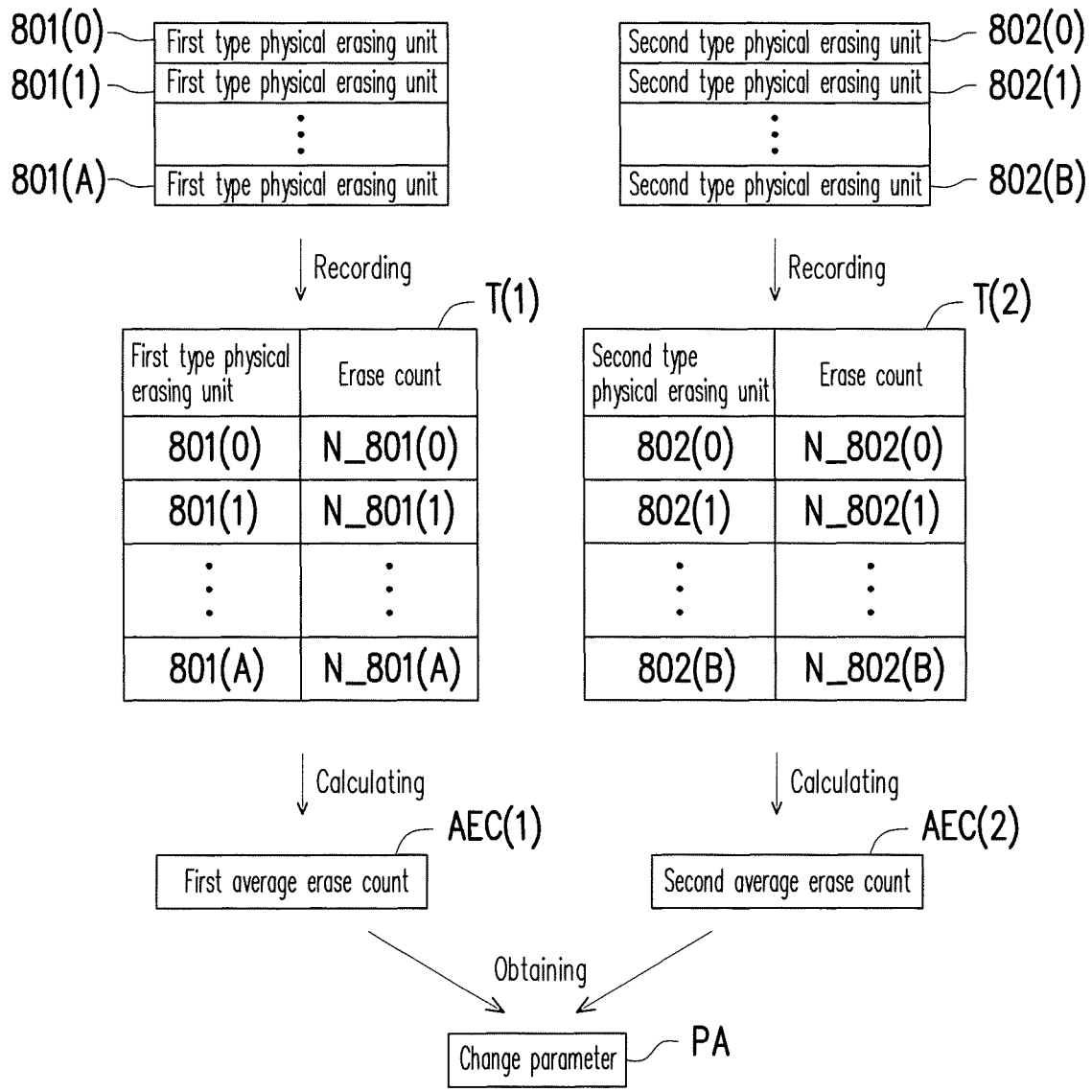
FIG. 8 illustrates a schematic diagram for obtaining the change parameter according to an exemplary embodiment of the invention.

FIG. 8 illustrates a schematic diagram for obtaining the change parameter according to an exemplary embodiment. Referring to FIG. 8, the memory management circuit 502 divides the physical erasing units in the rewritable non-volatile memory module 406 into first type physical erasing units 801(0) to 801(A) and second type physical erasing units 802(0) to 802(B). A and B are positive integers.

In the present exemplary embodiment, the usage parameter is an erase count of an erase operation performed on one physical erasing unit. The memory management circuit 502 can record the erase count for each of the physical erasing units and record the erase counts into an erase count table. The erase count table may be stored into at least one of the physical erasing units in the system area 606. The memory management circuit 502 can record the erase counts of the first type physical erasing units and the second type physical erasing units by utilizing one or more erase count tables. For example, the memory management circuit 502 records erase counts $N\_801(0)$ to $N\_801(A)$ of the first type physical erasing units 801(0) to 801(A) into an erase count table $T(1)$, and records erase counts $N\_802(0)$ to $N\_802(B)$ of the second type physical erasing units 802(0) to 802(B) into an erase count table $T(2)$. The memory management circuit 502 can update the erase count corresponding to one physical erasing unit in the erase count table right after the erase operation is completed for that physical erasing unit by, for example, adding one to the erase count corresponding to that physical erasing unit.

The memory management circuit 502 can obtain an average erase count (a.k.a. a first average erase count) of the first type physical erasing units 801(0) to 801(A) and obtain an average erase count (a.k.a. a second average erase count) of the second type physical erasing units 802(0) to 802(B). For example, the memory management circuit 502 can calculate the average erase count of the first type physical erasing units 801(0) to 801(A) (a.k.a. a first average erase count $AEC(1)$) by dividing a sum of the erase counts $N\_801(0)$ to $N\_801(A)$ of the first type physical erasing units 801(0) to 801(A) by the number of the first type physical erasing units 801(0) to 801(A) (i.e., A+1), and calculate the average erase count of the second type physical erasing units 802(0) to 802(B) (a.k.a. a second average erase count $AEC(2)$) by dividing a sum of the erase counts $N\_802(0)$ to $N\_802(B)$ of the second type physical erasing units 802(0) to 802(B) by the number of the second type physical erasing units 802(0) to 802(B) (i.e., B+1). Then, the memory management circuit 502 can obtain an erase count ratio according to the first average erase count $AEC(1)$ and the second average erase count $AEC(2)$ and set the erase count ratio as the change parameter. Further, the memory management circuit 502 can also calculate a specific value of the erase count ratio by dividing the first average erase count $AEC(1)$ by the second average erase count $AEC(2)$, and set the specific value of the erase count ratio as the change parameter. For instance, if the first average erase count $AEC(1)$ is 2000 and the second average erase count $AEC(2)$ is 100, the erase count ratio is 20:1 and the specific value of the erase count ratio is 20.

Furthermore, the memory management circuit 502 may store the change parameter into the buffer memory 508. Nevertheless, the memory management circuit 502 may also store the change parameter into the rewritable non-volatile memory module 406. In an exemplary embodiment, the memory management circuit 502 may re-obtain the change parameter once per a preset period of time. In another embodiment, the memory management circuit 502 may also re-obtain the change parameter each time when the write command is received and the write-data instructed by that write command matches the data condition. The timing for obtaining the change parameter and the method for storing the change parameter are not particularly limited in the present invention.

Although the usage parameter is the erase count in the exemplary embodiment of FIG. 8 for example, however, in other exemplary embodiments, the usage parameter may also be other parameter related to the use status. For example, in another exemplary embodiment, the usage parameter may be a program count of a programming operation (i.e., a write operation) performed on one physical erasing unit. The memory management circuit 502 can record the program counts of the physical erasing units into one or more program count tables, and stores the program count table(s) into at least one physical erasing unit in the system area 606. In this exemplary embodiment, the memory management circuit 502 can obtain an average program count (a.k.a. a first average program count) of the first type physical erasing units 801(0) to 801(A) and obtain an average program count (a.k.a. a second average program count) of the second type physical erasing units 802(0) to 802(B). As such, the memory management circuit 520 can obtain the change parameter by calculating a program count ratio or a specific value thereof according to the first average program count and the second average program count.

Moreover, in other exemplary embodiments, the usage parameter may also be a program count sum corresponding to the physical erasing units of various types. For example, when the first type physical erasing units (or the second type physical erasing units) are set as the use area, the memory management circuit 502 can calculate the program count sum of all the first type physical erasing units (or all the second type physical erasing units) being set as the use area, and set the program count sum as the change parameter. The memory management circuit 502 can add one to the usage parameter corresponding to one specific first type physical erasing unit or add one to the usage parameter corresponding to one specific second type physical erasing unit after the programming operation is completed for the specific first type physical erasing unit and the specific second type physical erasing unit. In particular, in this exemplary embodiment, the change parameter is reset as 0 when the use area is changed.

It is noted that, in an exemplary embodiment, the memory management circuit 502 can initially set the first type physical erasing units as the use area when the operation starts. Then, when receiving the write-data matching the data condition, the memory management circuit 502 can obtain the change parameter at the time according to the usage parameters of the first type physical erasing units 801(0) to 801(A) and the second type physical erasing units 802(0) to 802(B) at the time.

Figure 9:
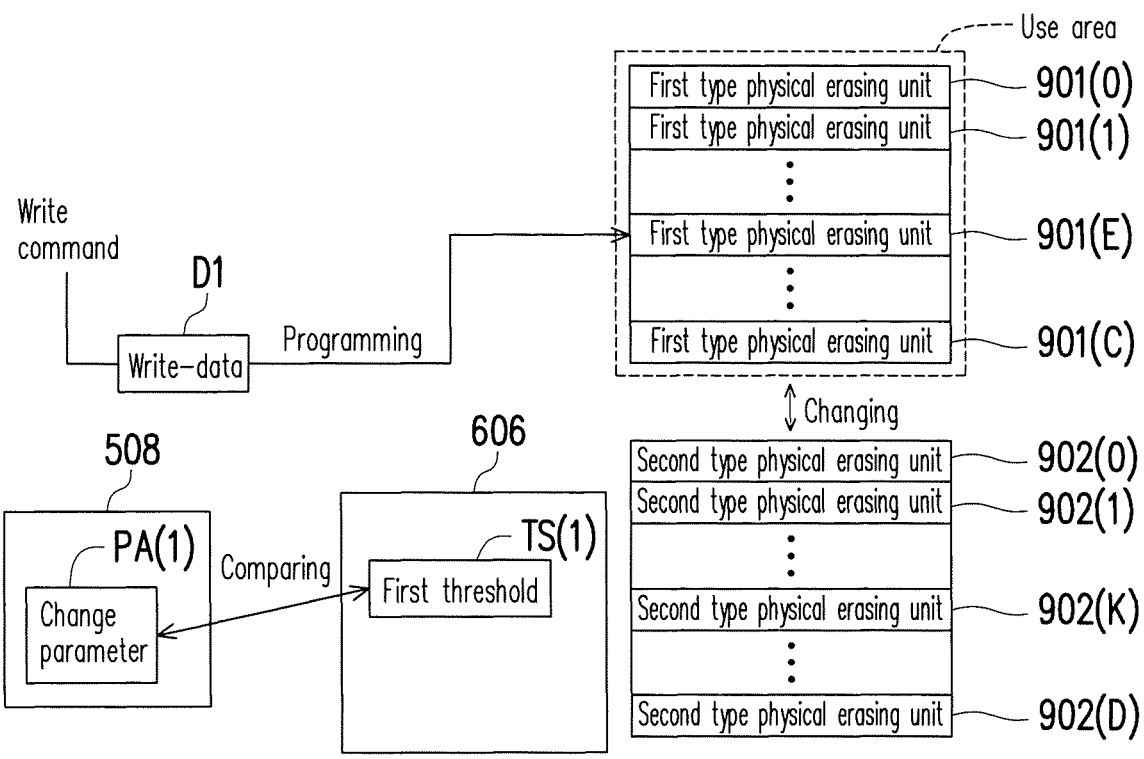
FIG. 9 illustrates a schematic diagram for programming data according to an exemplary embodiment of the invention.

FIG. 9 illustrates a schematic diagram for programming data according to an exemplary embodiment.

Referring to FIG. 9, the memory management circuit 502 divides the physical erasing units in the rewritable non-volatile memory module 406 into first type physical erasing units 901(0) to 901(C) and second type physical erasing units 902(0) to 902(D), where C and D are positive integers.

In the present exemplary embodiment, the memory management circuit 502 can preset one threshold (e.g., a first threshold TS(1)), and store the first threshold TS(1) into the physical erasing units in the system area 606. In the present exemplary embodiment, the first threshold TS(1) is set according to a maximum erase count of the first type physical erasing unit and a maximum erase count of the second type physical erasing unit. The maximum erase count is the number of times the erase operation can be performed on one physical erasing unit in its lifetime. The maximum erase count may be an estimated value as the factor setting of the rewritable non-volatile memory module 406. In general, because the first programming mode and the second programming mode can cause different wear levels on the physical erasing units, the maximum erase count of the first type physical erasing unit is greater than the maximum erase count of the second type physical erasing unit. For example, the maximum erase count of the first type physical erasing unit is 25000 times, and the maximum erase count of the second type physical erasing unit is 1000 times. In this case, the ratio of the first type physical erasing unit to the second type physical erasing unit in terms of the maximum erase count is 25:1, and the specific value corresponding to that ratio is 25. The memory management circuit 502 can set the first threshold TS(1) as a value greater than 0 but not greater than 25, such as 20.

As shown in FIG. 9, it is assumed that the first type physical erasing units 901(0) to 901(C) are the current use area, and a write-data D1 instructed by the received write command matches the data condition. In this case, the memory management circuit 502 can compare a change parameter PA(1) in the buffer memory 508 with the first threshold TS(1) in the system area 606 so as to determine whether the change parameter PA(1) matches a change condition (a.k.a. a first change condition). If the change parameter PA(1) at the time is not greater than the first threshold TS(1), the memory management circuit 502 determines that the change parameter PA(1) does not match the first change condition. Next, the memory management circuit 502 selects at least one first type physical erasing unit (e.g., the first type physical erasing unit 901(E)) from the current use area (i.e., the first type physical erasing units 901(0) to 901(C)), and programs the write-data D1 into the first type physical erasing unit 901(E) by using the first programming mode. On the other hand, if the change parameter PA(1) at the time is greater than the first threshold TS(1), the memory management circuit 502 determines that the change parameter PA(1) matches the first change condition. In this case, the memory management circuit 502 groups the second type physical erasing units 902(0) to 902(D) into the use area. Next, the memory management circuit 502 programs the write-data D1 into at least one second type physical erasing unit in the current use area (i.e., the second type physical erasing units 902(0) to 902(D)) by using the first programming mode. Later, when the other write-data matching the data condition is received and the change parameter PA(1) at the time does not match the first change condition, the memory management circuit 502 groups the first type physical erasing units 901(0) to 901(C) into the use area again, and programs the write-data into at least one first type physical erasing unit by using the first programming mode.

In other words, in the exemplary embodiment where one threshold is being set, when the change parameter does not match the change condition (i.e., not greater than the preset threshold), the memory management circuit 502 programs the write-data into the at least one first type physical erasing unit by using the first programming mode. However, when the change parameter becomes greater and matches the change condition (i.e., greater than the preset threshold) after the first type physical erasing units are continuously used, the memory management circuit 502 programs the write-data into the at least one second type physical erasing unit by using the first programming mode. When the change parameter becomes smaller and does not match the change condition after the second type physical erasing units are continuously used, the memory management circuit 502 once again programs the write-data into the at least one first type physical erasing unit by using the first programming mode.

Figure 10:
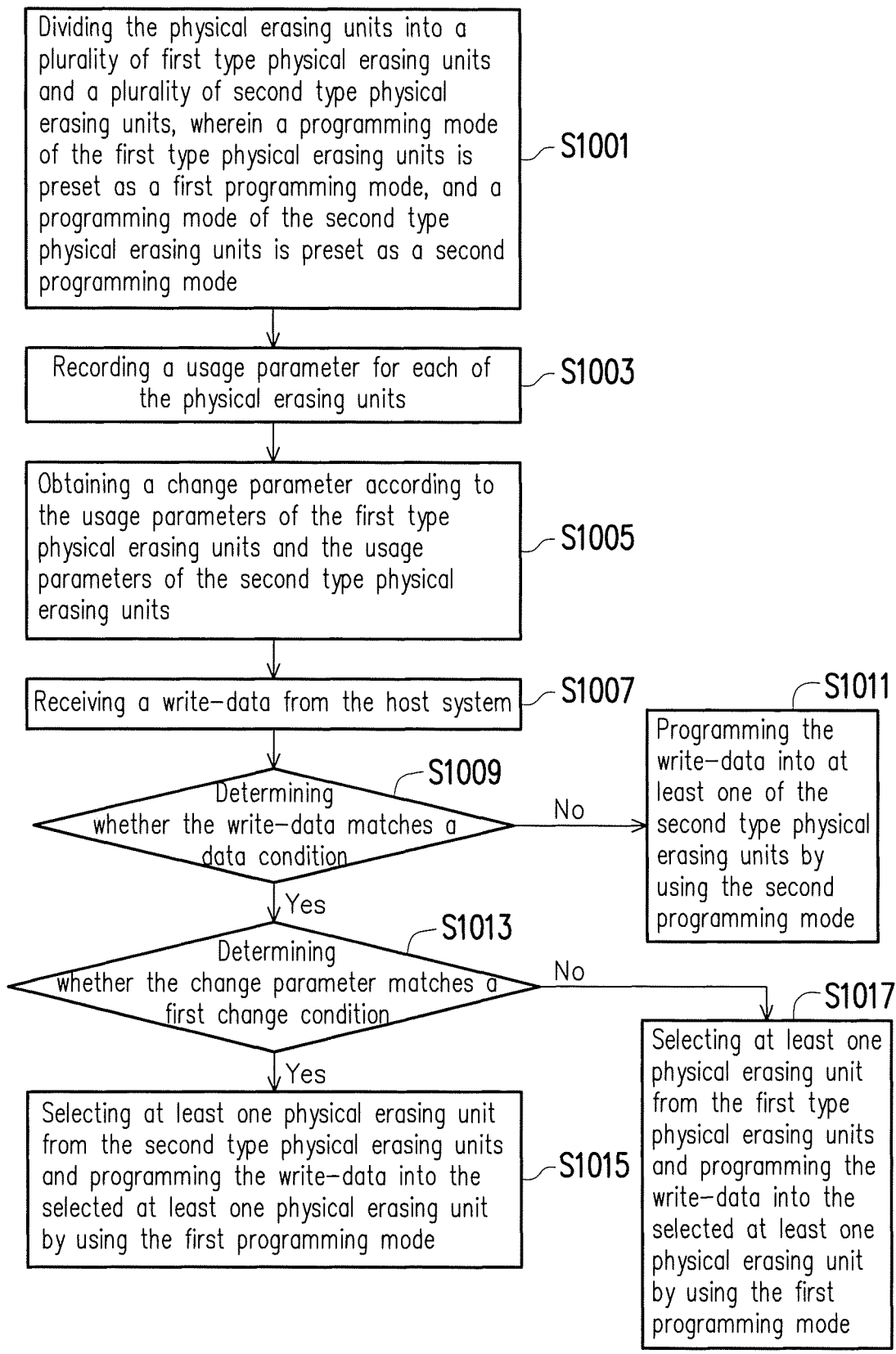
FIG. 10 is a flowchart illustrating a data programming method according to the exemplary embodiment of FIG. 9.

FIG. 10 is a flowchart illustrating a data programming method according to the exemplary embodiment of FIG. 9.

Referring to FIG. 10, in step S1001, the memory management circuit 502 divides the physical erasing units in the rewritable non-volatile memory module 406 into a plurality of first type physical erasing units and a plurality of second type physical erasing units, wherein a programming mode of the first type physical erasing units is preset as a first programming mode, and a programming mode of the second type physical erasing units is preset as a second programming mode.

In step S1003, the memory management circuit 502 records a usage parameter for each of the physical erasing units. Next, in step S1005, the memory management circuit 502 obtains a change parameter according to the usage parameters of the first type physical erasing units and the usage parameters of the second type physical erasing units.

In step S1007, the memory management circuit 502 receives a write-data from the host system. Next, in step S1009, the memory management circuit 502 determines whether the write-data matches a data condition. If the write-data does not match the data condition, in step S1011, the memory management circuit 502 programs the write-data into at least one of the second type physical erasing units by using the second programming mode.

However, if the write-data matches the data condition, in step S1013, the memory management circuit 502 determines whether the change parameter matches a first change condition. If the change parameter matches the first change condition, in step S1015, the memory management circuit 502 selects at least one physical erasing unit from the second type physical erasing units and programs the write-data into the selected at least one physical erasing unit by using the first programming mode. On the other hand, if the change parameter does not match the first change condition, in step S1017, the memory management circuit 502 selects at least one physical erasing unit from the first type physical erasing units and programs the write-data into the selected at least one physical erasing unit by using the first programming mode. Detail operations regarding each step in FIG. 10 have been described in the foregoing embodiments, and thus related descriptions are not repeated hereinafter.

Figure 11:
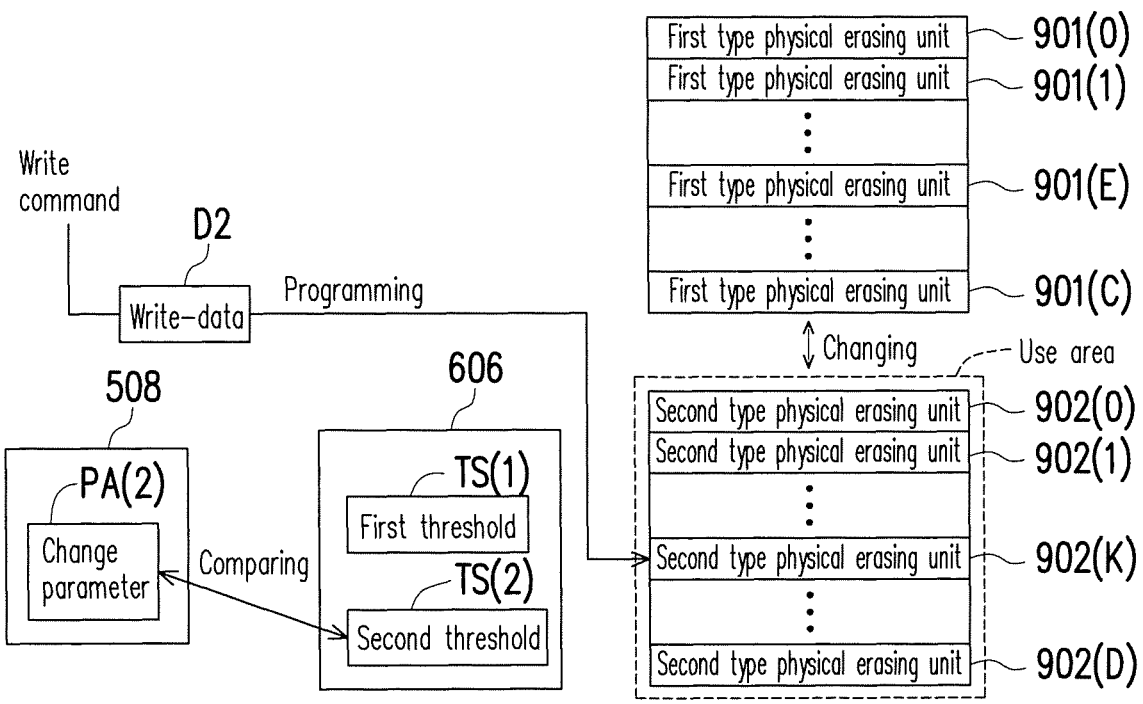
FIG. 11 illustrates a schematic diagram for programming data according to another exemplary embodiment of the invention.

FIG. 11 illustrates a schematic diagram for programming data according to another exemplary embodiment of the invention.

Hardware structure of a memory storage device in the exemplary embodiment of FIG. 11 is essentially identical to hardware structure of the memory storage device in the exemplary embodiment of FIG. 9. The difference between the two is that one threshold is preset in the exemplary embodiment of FIG. 9, whereas two thresholds are preset in the exemplary embodiment of FIG. 11. Operations of the memory storage device of the exemplary embodiment of FIG. 11 are described in details below with reference to the drawings and the reference numbers of the memory storage device of the exemplary embodiment of FIG. 9.

Referring to FIG. 11, in addition the first threshold TS(1), the memory management circuit 502 can further preset a second threshold TS(2). In the present exemplary embodiment, the first threshold TS(1) and the second threshold TS(2) may be set as different values according to the maximum erase count of the first type physical erasing units 901(0) to 901(C) and the maximum erase count of the second type physical erasing units 902(0) to 902(D). For example, a ratio of the first type physical erasing units 901(0) to 901(C) to the second type physical erasing units 902(0) to 902(D) in terms of the maximum erase count has a specific value of 25. The memory management circuit 502 can set the first threshold TS(1) and the second threshold TS(2) as values greater than 0 but not greater than 25, and set the first threshold TS(1) to be greater than the second threshold TS(2). For example, the first threshold TS(1) is preset as 20 and the second threshold TS(2) is preset as 10.

In the present exemplary embodiment, the memory management circuit 502 determines to compare a change parameter PA(2) with the first threshold TS(1) or the second threshold TS(2) according to the current use area. As shown in FIG. 11, it is assumed that the second type physical erasing units 902(0) to 902(C) are the current use area, and a write-data D2 instructed by the received write command matches the data condition. In this case, the memory management circuit 502 can compare the change parameter PA(2) in the buffer memory 508 with the second threshold TS(2) in the system area 606 so as to determine whether the change parameter PA(2) matches a change condition (a.k.a. a second change condition). If the change parameter PA(2) at the time is not less than the second threshold TS(2), the memory management circuit 502 determines that the change parameter PA(2) does not match the second change condition. Next, the memory management circuit 502 selects at least one second type physical erasing unit (e.g., the second type physical erasing unit 902(K)) from the current use area (i.e., the second type physical erasing units 902(0) to 902 (D)), and programs the write-data D2 into the second type physical erasing unit 902(K) by using the first programming mode. On the other hand, if the change parameter PA(2) at the time is less than the second threshold TS(2), the memory management circuit 502 determines that the change parameter PA(2) matches the second change condition. In this case, the memory management circuit 502 groups the first type physical erasing units 901(0) to 901(C) into the use area. Next, the memory management circuit 502 programs the write-data D2 into at least one first type physical erasing unit in the current use area (i.e., the first type physical erasing units 901(0) to 901(C)) by using the first programming mode. However, when the write-data matching the data condition is received again after the first type physical erasing units 901(0) to 901(C) are grouped into the use area, the memory management circuit 502 compares the change parameter at the time with the first threshold TS(1). If the change parameter at the time matches the first change parameter, the memory management circuit 502 groups the second type physical erasing units 902(0) to 902(D) into the current use area again, and programs the write-data into at least one second type physical erasing unit by using the first programming mode.

In other words, in the exemplary embodiment where two thresholds are preset, after the use area operates for a period of time after being set as the first type physical erasing units 901(0) to 901(C), if the change parameter matches the first change condition (i.e., the change parameter PA(2) is greater than the first threshold TS(1)), the memory management circuit 502 changes the use area from the first type physical erasing units 901(0) to 901(C) to the second type physical erasing units 902(0) to 902(D). After the use area operates for a period of time after being set as the second type physical erasing units 902(0) to 902(D), if the change parameter matches the second change condition (i.e., the change parameter PA(2) is less than the second threshold TS(2)), the memory management circuit 502 changes the use area from the second type physical erasing units 902(0) to 902(D) to the first type physical erasing units 901(0) to 901(C).

Figure 12:
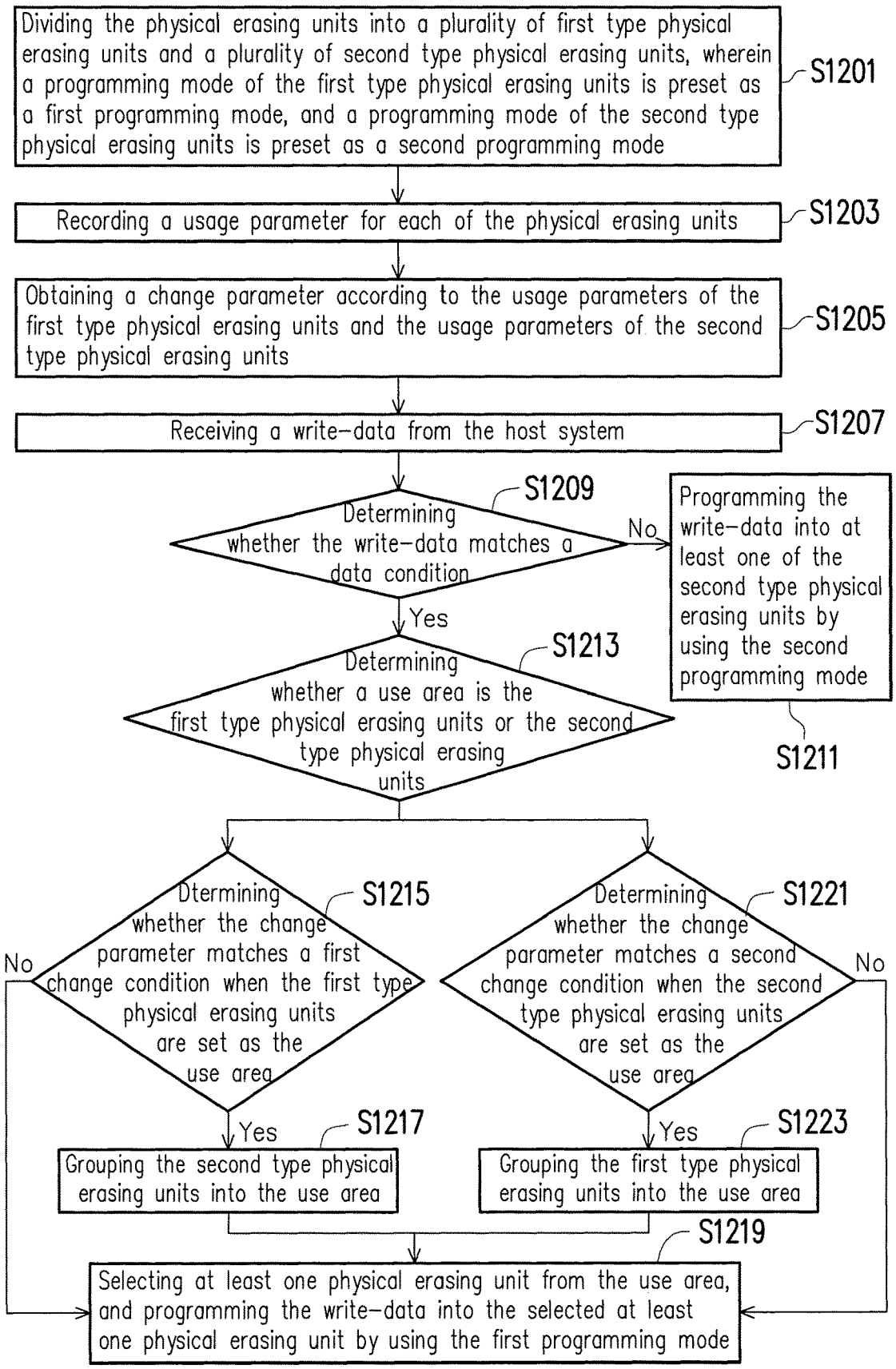
FIG. 12 is a flowchart illustrating a data programming method according to the exemplary embodiment of FIG. 11.

FIG. 12 is a flowchart illustrating a data programming method according to another exemplary embodiment of the invention.

In the present embodiment, in steps S1201 to S1211, the memory management circuit 502 performs the same operation described in steps S1001 to S1011, which are not repeated hereinafter. Only steps in FIG. 12 different from those of FIG. 10 are described.

Referring to FIG. 12, when the host system receives write-data, if the write-data matches the data condition, in step S1213, the memory management circuit 502 determines whether a use area is the first type physical erasing units or the second type physical erasing units. For example, the memory management circuit 502 can initially set the first type physical erasing units as the use area.

In step S1215, when the first type physical erasing units are set as the use area, the memory management circuit 502 determines whether the change parameter matches a first change condition.

If the change parameter matches the first change condition, in step S1217, the memory management circuit 502 groups the second type physical erasing units into the use area. Next, in step S1219, the memory management circuit 502 selects at least one physical erasing unit from the use area, and programs the write-data into the selected at least one physical erasing unit by using the first programming mode. However, the change parameter does not match the first change condition, the memory management circuit 502 directly proceeds to perform step S1219. In other words, in the case where the first type physical erasing units are set as the use area, when the change parameter matches the first change condition, the memory management circuit 502 changes the use area and selects the physical erasing unit from the second type physical erasing units. When the change parameter does not match the first change condition, the memory management circuit 502 does not change the use area but selects the physical erasing unit from the first type physical erasing units.

On the other hand, in step S1221, when the second type physical erasing units are grouped into the use area, the memory management circuit 502 determines whether the change parameter matches a second change condition. If the change parameter matches the second change condition, in step S1223, the memory management circuit 502 groups the first type physical erasing units into the use area. Next, the memory management circuit 502 proceeds to perform step S1219. However, if the change parameter does not match the second change condition, the memory management circuit 502 directly proceeds to perform step S1219. In other words, in the case where the second type physical erasing units are grouped into the use area, when the change parameter matches the second change condition, the memory management circuit 502 changes the use area and selects the physical erasing unit from the first type physical erasing units. When the change parameter does not match the second change condition, the memory management circuit 502 does not change the use area but selects the physical erasing unit from the second type physical erasing units. Detail operations regarding each step in FIG. 12 have been described in the foregoing embodiments, and thus related descriptions are not repeated hereinafter.

In the exemplary embodiments of FIG. 9 and FIG. 11, the usage parameter is the erase count. Nevertheless, in other exemplary embodiments, the usage parameter may also be the program count or the program count sum. For example, in the exemplary embodiment of FIG. 11, when the usage parameter is the program count sum, the memory management circuit can preset the first threshold TS(1) as 500 and preset the second threshold TS(2) as 20. In other words, the ratio of the first threshold TS(1) to the second threshold TS(2) may be equal to 25. In the example where the first type physical erasing units 901(0) to 901(C) are grouped into the use area, when the change parameter PA(2) is equal to the first threshold TS(1), the memory management circuit determines that the change parameter PA(2) matches the change condition. In the example where the second type physical erasing units 902(0) to 902(D) are grouped into the use area, when the change parameter PA(2) is equal to the second threshold TS(2), the memory management circuit determines that the change parameter PA(2) matches the change condition.

In summary, the change parameter for changing between the first type physical erasing units and the second type physical erasing units is obtained by monitoring the erase counts (or the program counts) of the first type physical erasing units and the second type physical erasing units in the invention. Further, when the write-data matches the data condition, the first type physical erasing units or the second type physical erasing units are selected in turns by determining whether the change parameter matches the change condition. Accordingly, the specific type physical erasing units can be prevented from being overly used, such that the rewritable non-volatile memory module can be prevented from damages before its time. As a result, the reliability and stability of the rewritable non-volatile memory module can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data programming method for a rewritable non-volatile memory module, wherein the rewritable non-volatile memory module comprises a plurality of physical erasing units, and the data programming method comprises:

dividing the physical erasing units into a plurality of first type physical erasing units and a plurality of second type physical erasing units, wherein a programming mode of the first type physical erasing units is preset as a first programming mode, a programming mode of the second type physical erasing units is preset as a second programming mode;

recording a usage parameter of each physical erasing unit among the physical erasing units;

obtaining a change parameter according to the usage parameters of the first type physical erasing units and the usage parameters of the second type physical erasing units;

receiving a write-data from a host system;

determining whether the change parameter matches a first change condition, wherein setting the first type physical erasing units as a use area before the step of determining whether the change parameter matches the first change condition;

setting the second type physical erasing units as the use area, selecting at least one physical erasing unit from the second type physical erasing units if the change parameter matches the first change condition, and programming the write-data into the at least one physical erasing unit selected from the second type physical erasing units by using the first programming mode;

determining whether the change parameter matches a second change condition when the second type physical erasing units are setting as the user area; and setting the first type physical erasing units as the use area, selecting at least one physical erasing unit from the first type physical erasing units if the change parameter matches the second change condition, and programming the write-data into the at least one physical erasing unit selected from the first type physical erasing units by using the first programming mode, wherein programming the write-data into the at least one physical erasing unit selected from the second type physical erasing units by using the first programming mode is performed in response to the change parameter matching the first change condition or the change parameter not matching the second change condition, wherein the change parameter matches the first change condition when the change parameter is greater than the first threshold, and the change parameter does not match the second change condition when the change parameter is greater than the second threshold, wherein the first threshold is greater than the second threshold.

2. The data programming method according to claim 1, wherein the step of determining whether the change parameter matches the second change condition comprises:

determining whether change parameter is less than a second threshold; and determining that the change parameter matches the second change condition if the change parameter is less than the second threshold.

3. The data programming method according to claim 1, further comprising:

determining whether the write-data matches a data condition; and performing the step of determining whether the change parameter matches the first change condition if the write-data matches the data condition.

4. The data programming method according to claim 3, wherein the step of determining whether the write-data matches the data condition comprises:

determining whether a data volume of the write-data is greater than a data volume threshold; and determining that the write-data matches the data condition if the data volume of the write-data is not greater than the data volume threshold.

5. The data programming method according to claim 3, wherein the step of determining whether the write-data matches the data condition comprises:

determining whether the write-data is a system data; and determining that the write-data matches the data condition if the write-data is the system data.

6. The data programming method according to claim 1, wherein the step of obtaining the change parameter according to the usage parameters of the first type physical erasing units and the usage parameters of the second type physical erasing units comprises:

obtaining a first average erase count according to erase counts of the first type physical erasing units, and obtaining a second average erase count according to erase counts of the second type physical erasing units; and obtaining the change parameter according to an erase count ratio between the first average erase count and the second average erase count.

7. The data programming method according to claim 1, wherein the step of obtaining the change parameter according to the usage parameters of the first type physical erasing units and the usage parameters of the second type physical erasing units comprises:

obtaining a first average program count according to program counts of the first type physical erasing units, and obtaining a second average program count according to program counts of the second type physical erasing units; and obtaining the change parameter according to a program count ratio between the first average program count and the second average program count.

8. The data programming method according to claim 1, wherein the physical erasing units are constituted by a plurality of memory cells, and a number of data bits stored by each memory cell among the memory cells constituting the first type physical erasing units after being programmed by using the first programming mode is less than a number of data bits stored by each memory cell among the memory cells constituting the second type physical erasing units after being programmed by using the second programming mode.

9. A memory storage device, comprising:

a connection interface unit, configured to couple to a host system;

a rewritable non-volatile memory module comprising a plurality of physical erasing units; and a memory control circuit unit, coupled to the connection interface unit and the rewritable non-volatile memory module, wherein the memory control circuit unit is configured to divide the physical erasing units into a plurality of first type physical erasing units and a plurality of second type physical erasing units, wherein a programming mode of the first type physical erasing units is preset as a first programming mode, a programming mode of the second type physical erasing units is preset as a second programming mode, wherein the memory control circuit unit is further configured to record a usage parameter of each physical erasing unit among the physical erasing units, wherein the memory control circuit unit is further configured to obtain a change parameter according to the usage parameters of the first type physical erasing units and the usage parameters of the second type physical erasing units, wherein the memory control circuit unit is further configured to receive a write-data from the host system, wherein the memory control circuit unit is further configured to determine whether the change parameter matches a first change condition, wherein the memory control circuit unit configured to set the first type physical erasing units as a use area before determine whether the change parameter matches the first change condition, wherein if determining that the change parameter matches the first change condition, the memory control circuit unit is further configured to set the second type physical erasing units as the use area, select at least one physical erasing unit from the second type physical erasing units and program the write-data into the at least one physical erasing unit selected from the second type physical erasing units by using the first programming mode, wherein the memory control circuit unit is further configured to determine whether the change parameter matches a second change condition when the second type physical erasing units are setting as the user area, wherein the memory control circuit unit is further configured to set the first type physical erasing units as the use area, select at least one physical erasing unit from the first type physical erasing units if the change parameter matches the second change condition and program the write-data into the at least one physical erasing unit selected from the first type physical erasing units by using the first programming mod;

wherein programming the write-data into the at least one physical erasing unit selected from the second type physical erasing units by using the first programming mode is performed in response to the change parameter matching the first change condition or the change parameter not matching the second change condition, wherein the change parameter matches the first change condition when the change parameter is greater than the first threshold, and the change parameter does not match the second change condition when the change parameter is greater than the second threshold, wherein the first threshold is greater than the second threshold.

10. The memory storage device of claim 9, wherein the operation of determining whether the change parameter matches the second change condition by the memory control circuit unit comprises:

determining whether change parameter is less than a second threshold; and determining that the change parameter matches the second change condition if the change parameter is less than the second threshold.

11. The memory storage device of claim 9, wherein the memory control circuit unit is further configured to determine whether the write-data matches a data condition, and perform the operation of determining whether the change parameter matches the first change condition if the write-data matches the data condition.

12. The memory storage device of claim 11, wherein the operation of determining whether the write-data matches the data condition by the memory control circuit unit comprises:

determining whether a data volume of the write-data is greater than a data volume threshold; and determining that the write-data matches the data condition if the data volume of the write-data is not greater than the data volume threshold.

13. The memory storage device of claim 11, wherein the operation of determining whether the write-data matches the data condition by the memory control circuit unit comprises:

determining whether the write-data is a system data; and determining that the write-data matches the data condition if the write-data is the system data.

14. The memory storage device of claim 9, wherein the operation of obtaining the change parameter according to the usage parameters of the first type physical erasing units and the usage parameters of the second type physical erasing units by the memory control circuit unit comprises:

obtaining a first average erase count according to erase counts of the first type physical erasing units, and obtaining a second average erase count according to erase counts of the second type physical erasing units; and obtaining the change parameter according to an erase count ratio between the first average erase count and the second average erase count.

15. The memory storage device of claim 9, wherein the operation of obtaining the change parameter according to the usage parameters of the first type physical erasing units and the usage parameters of the second type physical erasing units by the memory control circuit unit comprises:

obtaining a first average program count according to program counts of the first type physical erasing units, and obtaining a second average program count according to program counts of the second type physical erasing units; and obtaining the change parameter according to a program count ratio between the first average program count and the second average program count.

16. The memory storage device of claim 9, wherein the physical erasing units are constituted by a plurality of memory cells, and a number of data bits stored by each memory cell among the memory cells constituting the first type physical erasing units after being programmed by using the first programming mode is less than a number of data bits stored by each memory cell among the memory cells constituting the second type physical erasing units after being programmed by using the second programming mode.

17. A memory control circuit unit for controlling a rewritable non-volatile memory module, wherein the rewritable non-volatile memory module comprises a plurality of physical erasing units, wherein the memory control circuit unit comprises:

a host interface configured to couple to a host system;

a memory interface, configured to couple to the rewritable non-volatile memory module; and a memory management circuit, coupled to the host interface and the memory interface, wherein the memory management circuit is configured to divide the physical erasing units into a plurality of first type physical erasing units and a plurality of second type physical erasing units, wherein a programming mode of the first type physical erasing units is preset as a first programming mode, a programming mode of the second type physical erasing units is preset as a second programming mode, wherein the memory management circuit is further configured to record a usage parameter of each physical erasing unit among the physical erasing units, wherein the memory management circuit is further configured to obtain a change parameter according to the usage parameters of the first type physical erasing units and the usage parameters of the second type physical erasing units, wherein the memory management circuit is further configured to receive a write-data from the host system, wherein the memory management circuit is configured to determine whether the change parameter matches a first change condition, wherein the memory control circuit unit configured to set the first type physical erasing units as a use area before determine whether the change parameter matches the first change condition, wherein if determining that the change parameter matches the first change condition, the memory management circuit is further configured to set the second type physical erasing units as the use area, select at least one physical erasing unit from the second type physical erasing units and program the write-data into the at least one physical erasing unit selected from the second type physical erasing units by using the first programming mode, wherein the memory control circuit unit is further configured to determine whether the change parameter matches a second change condition when the second type physical erasing units are setting as the user area, wherein the memory control circuit unit is further configured to set the first type physical erasing units as the use area, select at least one physical erasing unit from the first type physical erasing units if the change parameter matches the second change condition and program the write-data into the at least one physical erasing unit selected from the first type physical erasing units by using the first programming mode, wherein programming the write-data into the at least one physical erasing unit selected from the second type physical erasing units by using the first programming mode is performed in response to the change parameter matching the first change condition or the change parameter not matching the second change condition, wherein the change parameter matches the first change condition when the change parameter is greater than the first threshold, and the change parameter does not match the second change condition when the change parameter is greater than the second threshold, wherein the first threshold is greater than the second threshold.

18. The memory control circuit unit of claim 17, wherein the operation of determining whether the change parameter matches the second change condition by the memory management circuit comprises:
   determining whether change parameter is less than a second threshold; and
   determining that the change parameter matches the second change condition if the change parameter is less than the second threshold.

19. The memory control circuit unit of claim 17, wherein the memory management circuit is further configured to determine whether the write-data matches a data condition, and perform the operation of determining whether the change parameter matches the first change condition if the write-data matches the data condition.

20. The memory control circuit unit of claim 19, wherein the operation of determining whether the write-data matches the data condition by the memory management circuit comprises:
   determining whether a data volume of the write-data is greater than a data volume threshold; and
   determining that the write-data matches the data condition if the data volume of the write-data is not greater than the data volume threshold.

21. The memory control circuit unit of claim 19, wherein the operation of determining whether the write-data matches the data condition by the memory management circuit comprises:
   determining whether the write-data is a system data; and
   determining that the write-data matches the data condition if the write-data is the system data.

22. The memory control circuit unit of claim 17, wherein the operation of obtaining the change parameter according to the usage parameters of the first type physical erasing units and the usage parameters of the second type physical erasing units by the memory management circuit comprises:
   obtaining a first average erase count according to erase counts of the first type physical erasing units, and obtaining a second average erase count according to erase counts of the second type physical erasing units; and
   obtaining the change parameter according to an erase count ratio between the first average erase count and the second average erase count.

23. The memory control circuit unit of claim 17, wherein the operation of obtaining the change parameter according to the usage parameters of the first type physical erasing units and the usage parameters of the second type physical erasing units by the memory management circuit comprises:
   obtaining a first average program count according to program counts of the first type physical erasing units, and obtaining a second average program count according to program counts of the second type physical erasing units; and
   obtaining the change parameter according to a program count ratio between the first average program count and the second average program count.

24. The memory control circuit unit of claim 17, wherein the physical erasing units are constituted by a plurality of memory cells, and a number of data bits stored by each memory cell among the memory cells constituting the first type physical erasing units after being programmed by using the first programming mode is less than a number of data bits stored by each memory cell among the memory cells constituting the second type physical erasing units after being programmed by using the second programming mode.

* * * * *